United States Patent [19]

Kinoshita et al.

[11] Patent Number: 5,757,949
[45] Date of Patent: May 26, 1998

[54] WARNING SYSTEM FOR VEHICLE

[75] Inventors: Masahiro Kinoshita, Oota; Atsushi Ikeda, Ashikaga; Kazumasa Arai, Oota, all of Japan

[73] Assignee: Fuji Jukogyo Kabushiki Kaisha, Tokyo, Japan

[21] Appl. No.: 591,005

[22] Filed: Jan. 24, 1996

[30] Foreign Application Priority Data

Jan. 27, 1995 [JP] Japan .................................... 7-011836

[51] Int. Cl.$^6$ .................................................... G06K 9/00
[52] U.S. Cl. ........................ 382/104; 382/154; 340/901; 340/437; 340/441; 340/466; 340/467; 348/113; 364/423.098
[58] Field of Search ............................ 382/104, 154; 340/901, 936, 937, 437, 441, 466, 467; 348/113; 364/423.098, 424.018, 426.021, 426.023, 426.045; G06K 9/00

[56] References Cited

U.S. PATENT DOCUMENTS

| | | | |
|---|---|---|---|
| 5,081,585 | 1/1992 | Kurami et al. | 364/424.02 |
| 5,208,750 | 5/1993 | Kurami et al. | 364/424.02 |
| 5,315,295 | 5/1994 | Fujii | 340/936 |
| 5,350,912 | 9/1994 | Ishida | 250/202 |
| 5,359,666 | 10/1994 | Nakayama et al. | 382/1 |

FOREIGN PATENT DOCUMENTS 5141979 6/1993 Japan .

*Primary Examiner*—Thomas L. Stoll
*Attorney, Agent, or Firm*—Beveridge, Degrandi, Weilacher & Young, L.L.P.

[57] ABSTRACT

A warning system estimates the possibility of the off-course travel of a vehicle while traveling through a curve before the vehicle enters the curve and gives the driver a warning properly. The warning system comprises an image recognizing means for obtaining three-dimensional image data on the road extending ahead of the vehicle and the traffic environment lying ahead of the same by recognizing conditions of the road and the traffic, a curve detecting means for detecting a curve on the basis of the image data before the vehicle enters the curve, a turning speed calculating means for calculating a reference turning speed at which average drivers will drive the vehicle traveling the curve on the basis of the radius of curvature of the curve and the width of the lane represented by the image data, a relative curve sharpness detecting means for deciding whether or not the relative sharpness of the curve is critical by comparing the reference turning speed with the actual traveling speed of the vehicle, and an off-course travel estimating means for deciding, when the relative sharpness detecting means decides that the relative sharpness of the curve is critical, whether or not the driver has carried out danger avoiding operations from signals indicating decelerating operations, and, if any danger avoiding operation is not executed, deciding that off-course travel is possible and giving a warning.

2 Claims, 7 Drawing Sheets

WARNING SYSTEM FOR VEHICLE

BACKGROUND OF THE INVENTION

1. Field of the Invention

The present invention relates to a warning system for a vehicle, such as an automobile, for assisting the driver of a vehicle while the vehicle is traveling and, more specifically, to a warning system to prevent the deviation of the vehicle from an intended course while the vehicle is traveling a curve.

2. Description of the Related Art

Recently, an ADA system (Active Drive Assist system), i.e., a comprehensive driver assisting system for actively assisting the driver in driving a vehicle, has been developed in an attempt to enhance the safety of vehicles to cope with progressively increasing traffic accidents. The recognition of the conditions of the surroundings is an essential function of the ADA system. Recent advanced technology has made possible the three-dimensional recognition of road conditions and traffic conditions in a practically effective accuracy and time by processing image information about a scene lying ahead of the vehicle acquired by a plurality of cameras. The ADA system is intended to assist the driver to drive a vehicle safely in many respects by using image data on road conditions and traffic conditions when the driver fails in correct driving operations, when the driver looks aside and/or when the driver dozes off at the wheel during monotonous driving.

A previously proposed drive assistance system is based on a conception that every operation of a vehicle is to be controlled by a man and intends preventive security for avoiding expected dangers. The driver assistance system gives a warning to warn and the driver against an expected danger to assist the driver when a car collision or off-course travel is expected and, if the driver does not take appropriate measures to avoid danger in response to the warning, carriers out operations temporarily for the driver to avoid a car collision or off-course travel by automatically controlling the brake system, the throttle and/or the steering system to return the condition to safety.

The warning provided by the ADA system is very important for estimating various possible conditions and enhancing preventive security. Therefore, it is necessary to warn properly to enable the driver to take danger avoiding measures by deciding the situation and accurately estimating a possible condition. Off-course travel at a sharp curve is one of the possible conditions. Particularly, off-course travel is liable to occur while the vehicle traveling a sharply curved exit ramp immediately after leaving a lane of a highway, because the driver's sense of speed is numbed and it is desirable to give an appropriate warning against such off-course travel.

A warning system that gives an warning against off-course travel that occurs at a sharp curve is disclosed, for example, in JP-U No. 5-46612. This prior art warning system decides the condition of a vehicle from the relationship between steering angle and transverse acceleration and, for example, when the warning system decides that both the traveling speed and the transverse acceleration is increasing during a turning travel at a fixed steering angle, the warning system gives a warning to prevent off-course travel due to an excessively high traveling speed.

However, since the prior art warning systems makes a decision after detecting an actual acceleration acting on the vehicle in a turning travel, the prior art warning system is unable to estimates possible off-course travel before the vehicle enters a curve. Since the curvature of curves and the width of lanes are not detected, the accuracy of the decision is unsatisfactory.

SUMMARY OF THE INVENTION

Accordingly, it is an object of the present invention to provide a warning system for a vehicle, capable of estimating the possibility of off-course travel before the vehicle enters a curve and of properly giving a warning against off-course travel.

According to a first aspect of the present invention, a warning system for a vehicle comprises an image recognizing means for obtaining three-dimensional image data on road conditions and traffic conditions by recognizing the road extending ahead of the vehicle and traffic conditions, a curve detecting means for detecting a curve on the basis of the image data before the vehicle enters the curve, a turning speed calculating means for calculating a reference turning speed at which average drivers will drive the vehicle traveling the curve on the basis of the radius of curvature of the curve and the width of the lane represented by the image data, a relative curve sharpness detecting means for deciding whether or not the relative sharpness of the curve is critical by comparing the reference turning speed with the actual traveling speed of the vehicle, and an off-course travel estimating means for deciding, when the relative sharpness detecting means decides that the relative sharpness of the curve is critical, whether or not the driver has carried out danger avoiding operations from signals indicating decelerating operations and, if any danger avoiding operation has not been executed, deciding that off-curse travel is possible and giving a warning.

According to a second aspect of the present invention, the off-course travel estimating means calculates a deceleration necessary for decelerating the vehicle to a turning speed before the vehicle enters the curve when it is decided that the relative sharpness of the curve is critical, and estimates the possibility of off-course travel when the actual deceleration is lower than the calculated necessary deceleration.

The image recognizing means continuously recognizes the road extending ahead of the vehicle and traffic conditions while the vehicle is traveling, and the curve detecting means detects the condition of the curve accurately on the basis of the image data provided by the image recognizing means before the vehicle enters the curve, and then the curve traveling speed calculating means calculates a reference curve traveling speed at which average drivers will drive the vehicle traveling the curve on the basis of the curvature and the width of the lane represented by the image data to determine appropriate curve traveling speeds for curves of different curvatures accurately to prevent off-course travel. Thus, a sharp curve on which off-course travel will possibly occur if the vehicle enters the curve at the actual traveling speed higher than the reference curve traveling speed can be accurately detected. When a sharp curve is detected, the off-course travel estimating means decides whether or not a danger avoiding operation has been carried out on the basis of a signal provided by an accelerator sensor, a brake signal provided by a brake switch and a deceleration signal provided by a traveling speed sensor and, if the driver fails to carry out a danger avoiding operation carelessly or mistakenly and the vehicle is not decelerated, estimates the possibility of off-course travel and gives the driver a warning to cell drivers attention before it becomes too late to execute a danger avoiding operation so that the vehicle enters the curve at a normal traveling speed.

When the off-course travel estimating means decide that the relative sharpness of the curve is critical, the possibility of off-course travel is estimated accurately, a deceleration necessary for decelerating the vehicle to the reference curve traveling speed is calculated, the actual speed is compared with the reference curve traveling speed and, if the driver's danger avoiding operation is not satisfactory, a warning is given.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
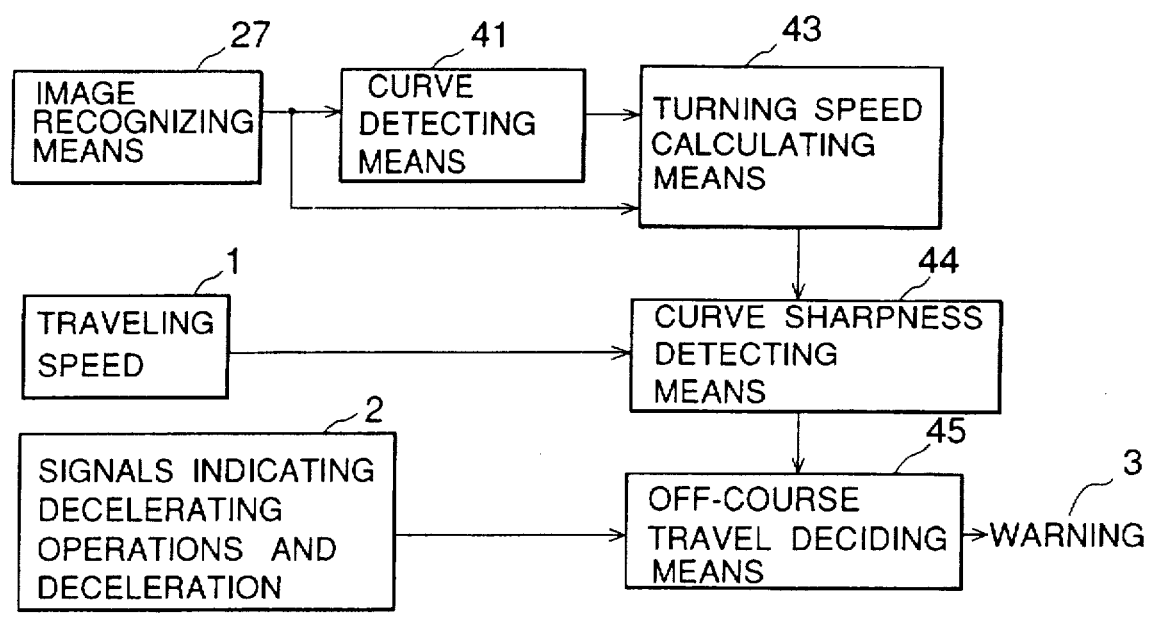
FIG. 1 is a block diagram of a warning system is accordance with the present invention.
Figure 2:
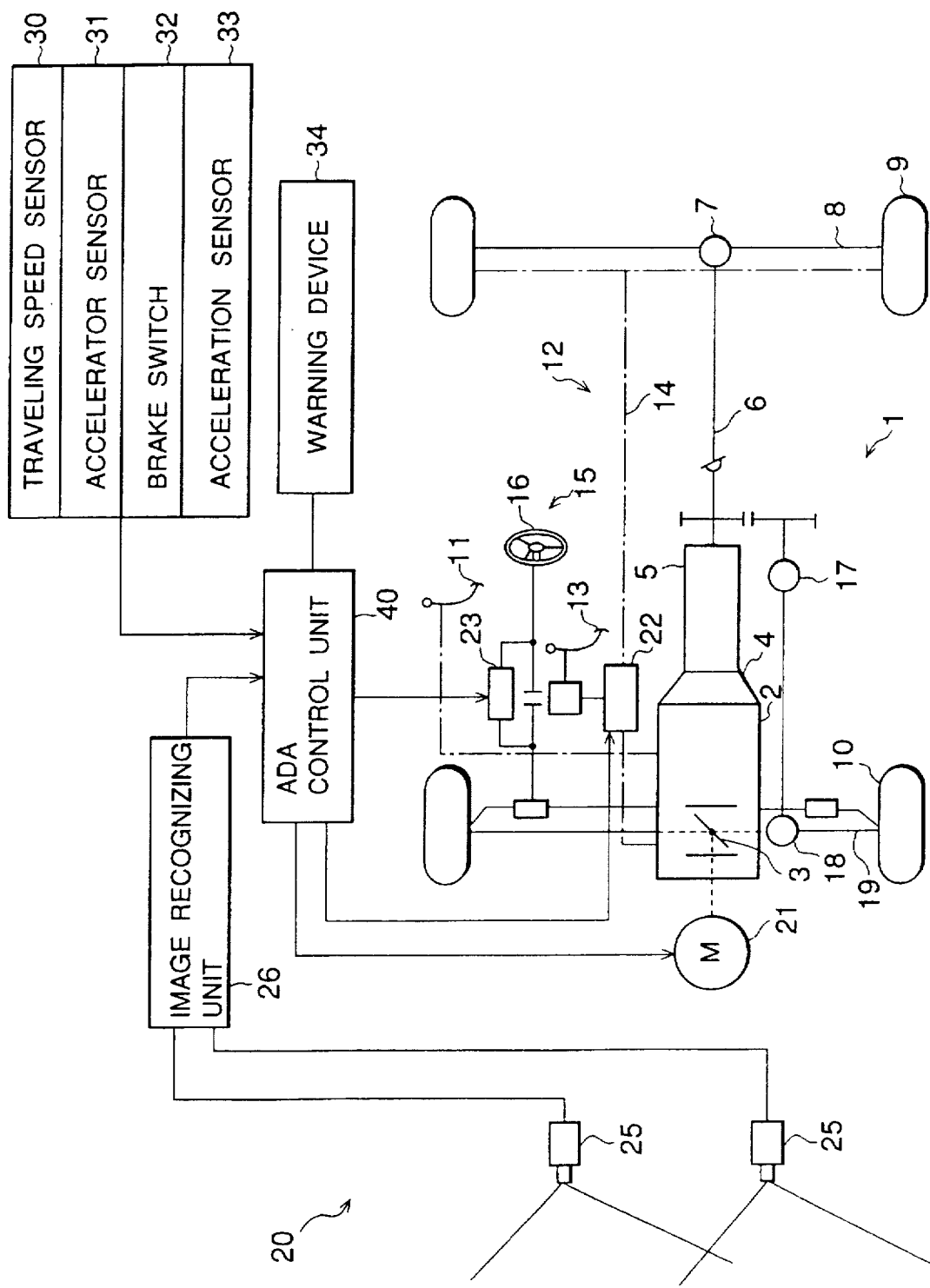
FIG. 2 is a partial diagrammatic block diagram of an ADA system in combination with a vehicle.

Referring to FIG. 2, a vehicle 1 has an engine 2 operatively connected through a clutch 4, a transmission 5, a propeller shaft 6, a rear differential 7 and rear axle 8 to rear wheels 9, and through the propeller shaft 6, a center differential 17, a front differential 18 and front axles 19 to front wheels 10 to drive the front wheels 10 and the rear wheels 9 for traveling. The vehicle 1 has an operation control system including an accelerator pedal 11 for operating a throttle valve 3 combined with the engine 2 to regulate the output of the engine 2, a brake system 12 including a brake pedal 13 for regulating the brake line pressure in a brake line 14 for distributing the brake line pressure to wheel cylinders combined with the front wheels 10 and the rear wheels 9, and a steering system 15 including a steering wheel 16 for steering the front wheels 10.

An ADA system 20 is provided with a throttle actuator 21 combined with the throttle valve 3 to reduce the output of the engine 2 forcibly when a throttle signal is given thereto, a brake actuator 22 connected to the brake line 14 of the brake system 12 to regulate the brake line pressure according to a brake signal for automatic braking, and a steering actuator 23 associated with the steering system 15 to control the steering wheel 16 according to a steering signal for automatic steering.

An electronic control system is provided with, for example, two CCD cameras 25 disposed on the right and the left side of the front end, respectively, of the vehicle 1, and an image recognizing unit 26 including a stereographic image processor. The two CCD cameras 25 takes images of scenes and the objects lying ahead of the vehicle 1 in a stereographic images and provides image signals. The image recognizing unit 26 processes the output image signals of the CCD cameras 25 by triangulation to calculate the distances between the vehicle and the objects lying ahead of the vehicle 1, produces a distance picture showing a three-dimensional distance distribution, detects a lane, a preceding vehicle and obstacles separately from the distance picture, recognizes lane marks, the three-dimensional configuration of the road, categorizes objects lying ahead of the vehicle 1, recognizes the distances between the vehicle 1, and the preceding vehicle and the obstacles, and the relative traveling speed of the preceding vehicle, and obtains image data on the road traffic conditions.

An ADA control unit 40 comprises a warning system which estimates various possible conditions and gives a warning, and a vehicle control system which controls the vehicle 1 when the driver fails in executing danger avoiding operations in response to a warning. The vehicle control system calculates an acceleration or deceleration on the basis of the image data and the output signals of sensors so that safe distances are maintained between the vehicle 1 and, for example, the preceding vehicle and road facilitates, and gives a throttle signal specifying a throttle opening corresponding to the calculated acceleration or deceleration to the throttle actuator 21 to control the output of the engine 2. The vehicle control system gives a brake signal specifying an appropriate brake line pressure corresponding to the calculated acceleration or deceleration to the brake actuator 22 for automatic braking. Thus, the safe distances can be maintained or collision can be avoided even if the driver does not operate the vehicle 1 properly or does not carry out danger avoiding operations. The vehicle control system sets a desired course to a position at a set distance on the picture, calculates an estimated course along which the vehicle will travel to the position at the set distance when the current traveling conditions are maintained, gives a steering signal corresponding to the deviation of the estimated course from the desired course to the steering actuator 23 for automatic steering. Thus, collision can be avoided and off-course travel can be prevented even if the driver does not operate the vehicle properly.

The warning operation of the warning system for giving a warning against off-course travel in a curve will be described. The warning system extracts information about the curvature of the curve, the width of the lane and such from the image data before the vehicle 1 enters the curve. The warning system is provided with a traveling speed sensor 30 which detects the traveling speed, an accelerator sensor 31 which detects a decelerating state established by the decelerating operation of the operator, a brake switch 32 which detects the application of the brake system, an acceleration sensor 33 which provides a deceleration signal upon the detection of acceleration, and a warning device which estimates the relative sharpness of the curve before the vehicle 1 enters the curve and, when off-course travel is expected, generates a warning.

Figure 3:
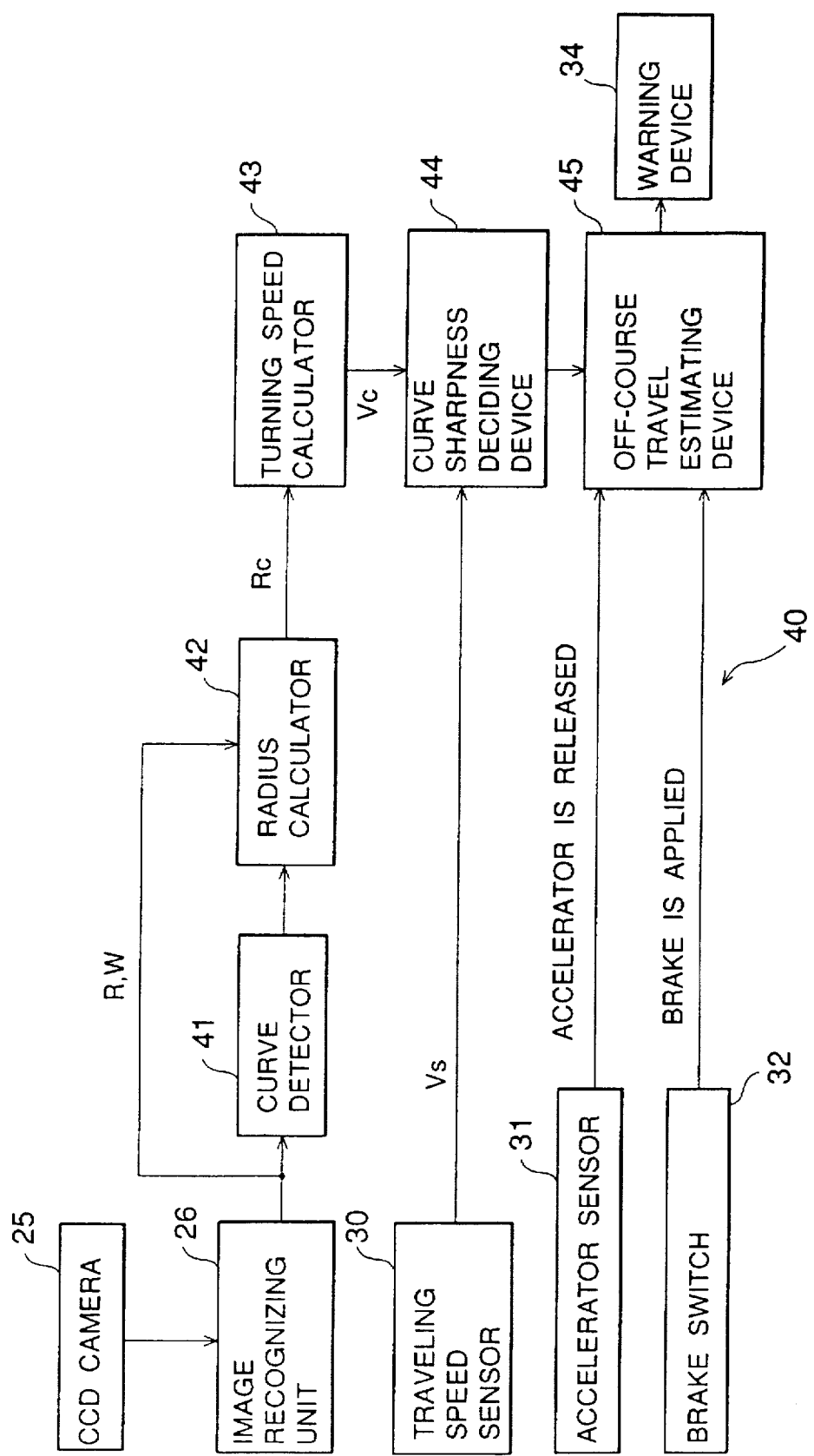
FIG. 3 is a block diagram of a warning system in a first embodiment according to the present invention.
Figure 4:
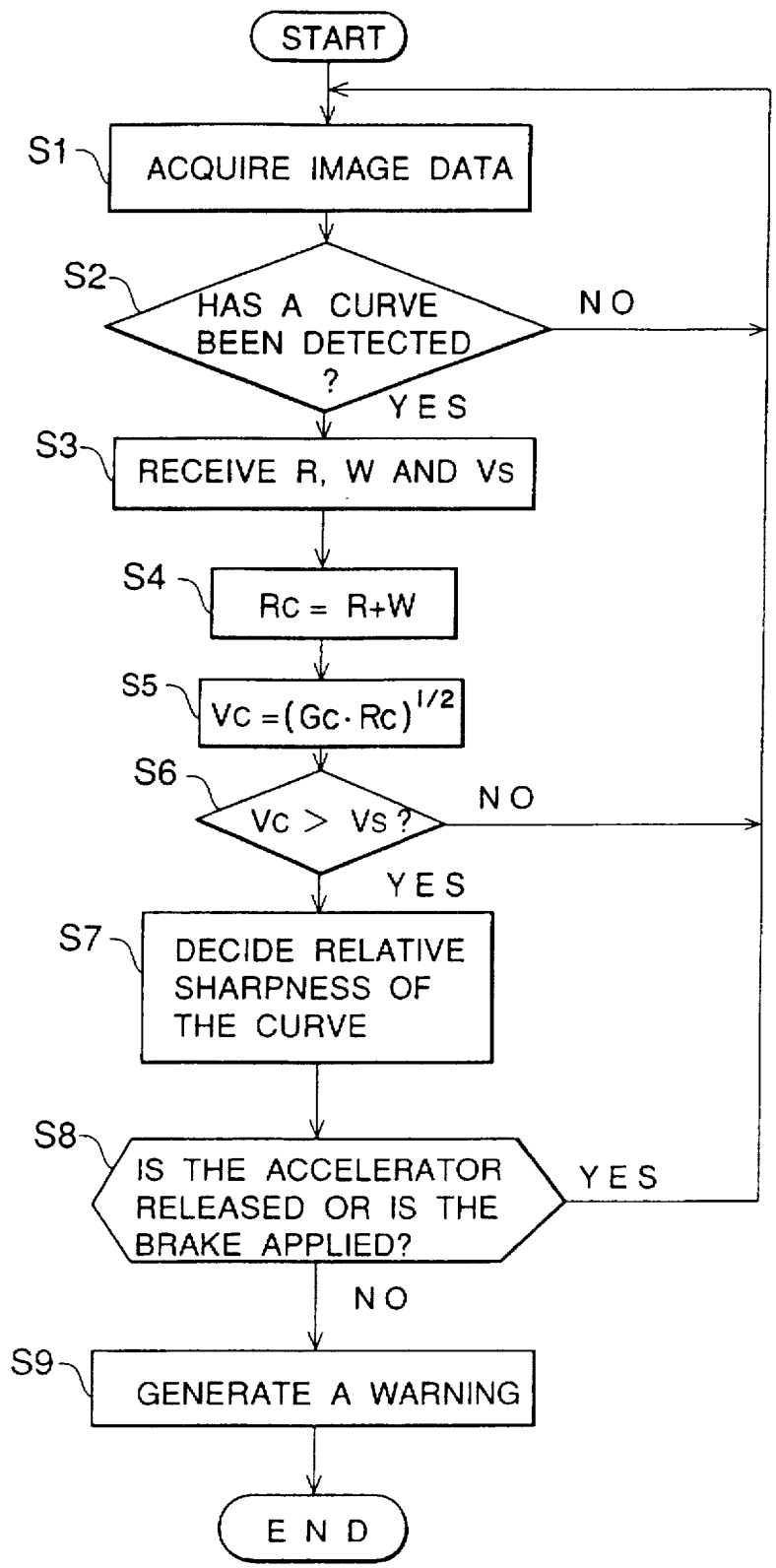
FIG. 4 is a flowchart of a warning control program to be executed by the warning system of FIG. 3.
Figure 5:
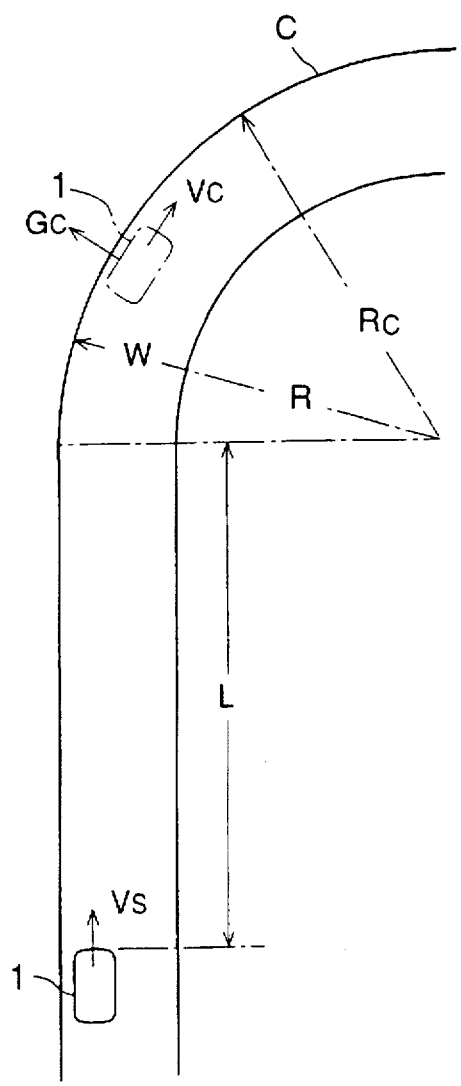
FIG. 5 is a diagrammatic view of assistance in explaining the configuration of a curve.

A curve sharpness deciding method and a warning operation to be carried out by a warning system in a first embodiment according to the present invention will be described with reference to FIGS. 3 and 4. In step S1, the image recognizing unit 26 processes the image signals provided by the two CCD Cameras 25 while the vehicle 1 is traveling to obtain image data on the road and traffic conditions. A curve detector 41 included in the ADA control unit 40 receives the image data and detects a curve C extending ahead of the vehicle 1 as shown in FIG. 5 in step S2 and, upon the detection of the curve C, reads information about the maximum radius R of curvature of the curve C and the width W of the lane included in the image data at a position before the curve C and the current actual traveling speed $V_s$ detected by the traveling speed sensor 30 in step S3. A radius calculator 42 calculates the maximum turning radius of an out-in-out traveling course using the entire width of the lane in step S4 by using $R_c=R+W$, where $R_c$ is the maximum turning radius, R is the radius of curvature of the curve C and W is the width of the lane. Then, a turning speed calculator 43 estimates a turning speed $V_c$ at which average drivers will drive the vehicle 1 in traveling the curve C, by using $Vc=(G_c \cdot R_e)^{1/2}$, where $G_c$ is transverse acceleration of, for example, 0.4G, in step S5. Thus, the turning speed $V_c$ that will not cause off-course travel can be accurately determined under different conditions, such as a condition where the radius R of curvature of the curve is large and the width W of the lane is small and a condition where the radius R of curvature is small and the width W of the lane is large.

A curve sharpness deciding device 44 compares the actual traveling speed $V_c$ of the vehicle 1 before the vehicle 1 enters the curve C of the turning speed $V_c$ to decide the relative sharpness of the curve C. When the actual traveling speed $V_e$ is lower than the turning speed $V_c$, the curve sharpness deciding device 44 decides that the relative sharpness of the curve C is not critical and the control operation is ended. If the actual traveling speed $V_c$ is higher than the turning speed $V_c$, the curve sharpness deciding device 44 decides that the sharpness of the curve C is critical and will cause off-course travel if the vehicle 1 enters the curve C at the current traveling speed $V_s$, and the program goes to step S7. When the driver visually recognizes the sharpness of the curve C and is conscious of the current traveling speed $V_c$ and the current traveling speed $V_s$ is held on a low level or when the driver decides that the current traveling speed $V_s$ is excessively high relative to the radius R of curvature of the curve C and the width W of the lane and decelerates the vehicle 1 at an early stage, the relative sharpness of the curve C is small and hence no warning is given. The vehicle 1 enters the curve C at the traveling speed $V_c$ and is able to travel safely through the curve C.

When the curve sharpness deciding device 44 decides that the relative sharpness of the curve C is critical, an off-course travel estimating device 45 checks the output signals of the accelerator sensor 31 and the brake switch 32 indicating deceleration in step S8 to see whether or not the driver has executed danger avoiding operations. If those signals are present, the off-course travel estimating device 45 decides that the driver has executed danger avoiding operations and ends the program. If the signals indicating deceleration are absent, the off-course travel estimating device 45 decides that no danger avoiding operation has been executed and gives a warning in step S9. When the driver recognizes the condition of the curve C and the traveling speed $V_s$, and executes danger avoiding operations, such as an operation to reduce the output of the engine 2 by releasing the accelerator pedal and an operation to decelerate the vehicle 1 by applying the brake system, no warning is given and the decelerated vehicle 1 travels safely through the curve C.

When the driver does not execute any danger avoiding operations due to carelessness or erroneous recognition, the off-course travel of the vehicle 1 in the curve C is expected and the warning device 34 generates a warning sound to coll driver's attention to the situation. Since the warning sound is generated before the vehicle 1 enters the curve C, there is enough time for the driver to execute danger avoiding operations to decelerate the vehicle in response to the warning before the vehicle 1 enters the curve C and, consequently, the decelerated vehicle 1 enters the curve C whereby off-course travel can be prevented. Thus, the warning system assists the driver in safety driving.

A curve sharpness deciding method and a warning operation to be carried out by a warning system in a second embodiment according to the present invention will be described with reference to FIGS. 6 and 7, in which components like or corresponding to those of the warning system in the first embodiment are designated by the same reference characters and the description thereof will be omitted. Functions of steps S1 through S6 of the control program shown in FIG. 7 to be executed by the second embodiment are the same as those of steps S1 through S6 of the control program shown in FIG. 4 to be executed by the first embodiment and hence the description of those steps will be omitted.

Figure 6:
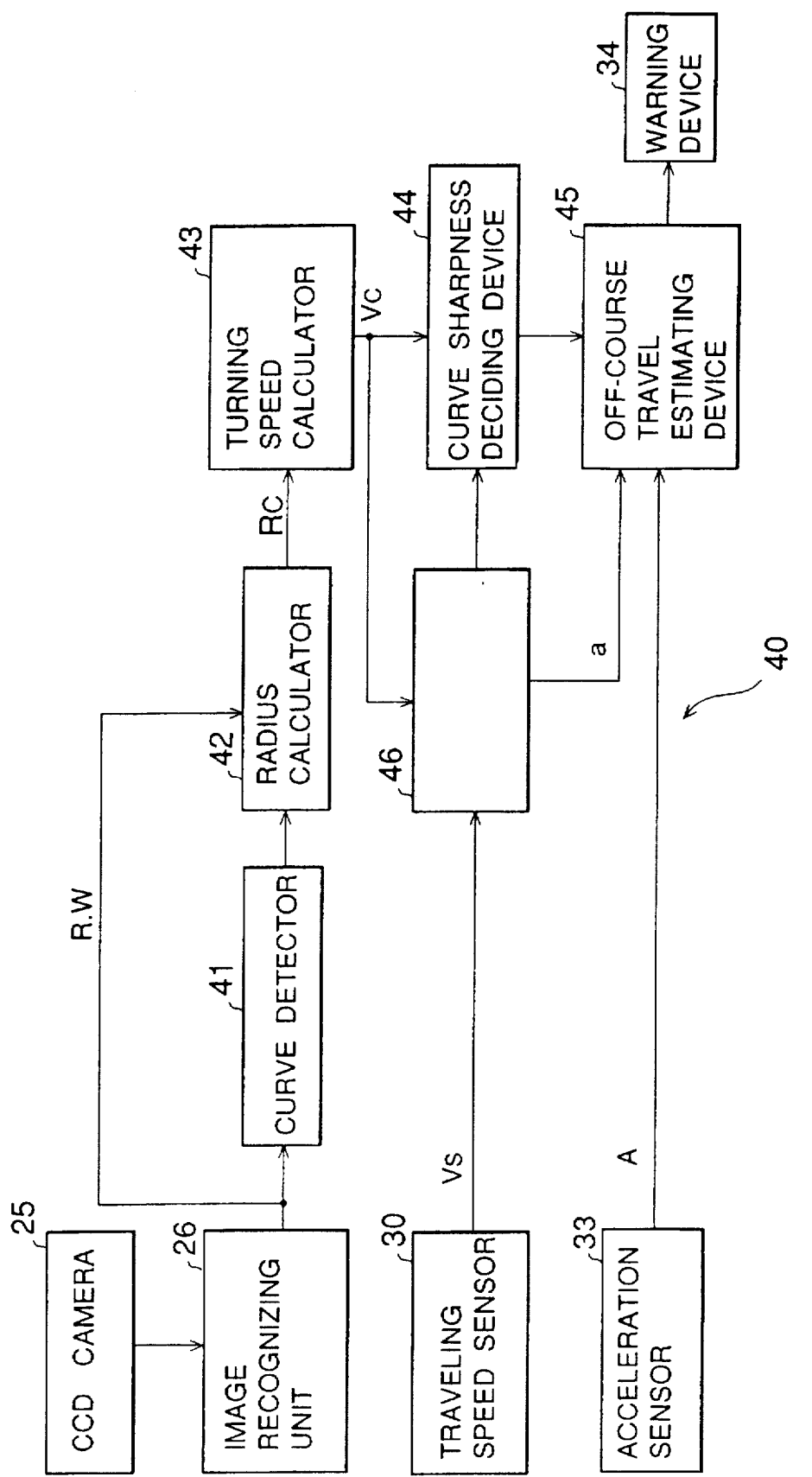
FIG. 6 is a block diagram of a warning system in a second embodiment according to the present invention.
Figure 7:
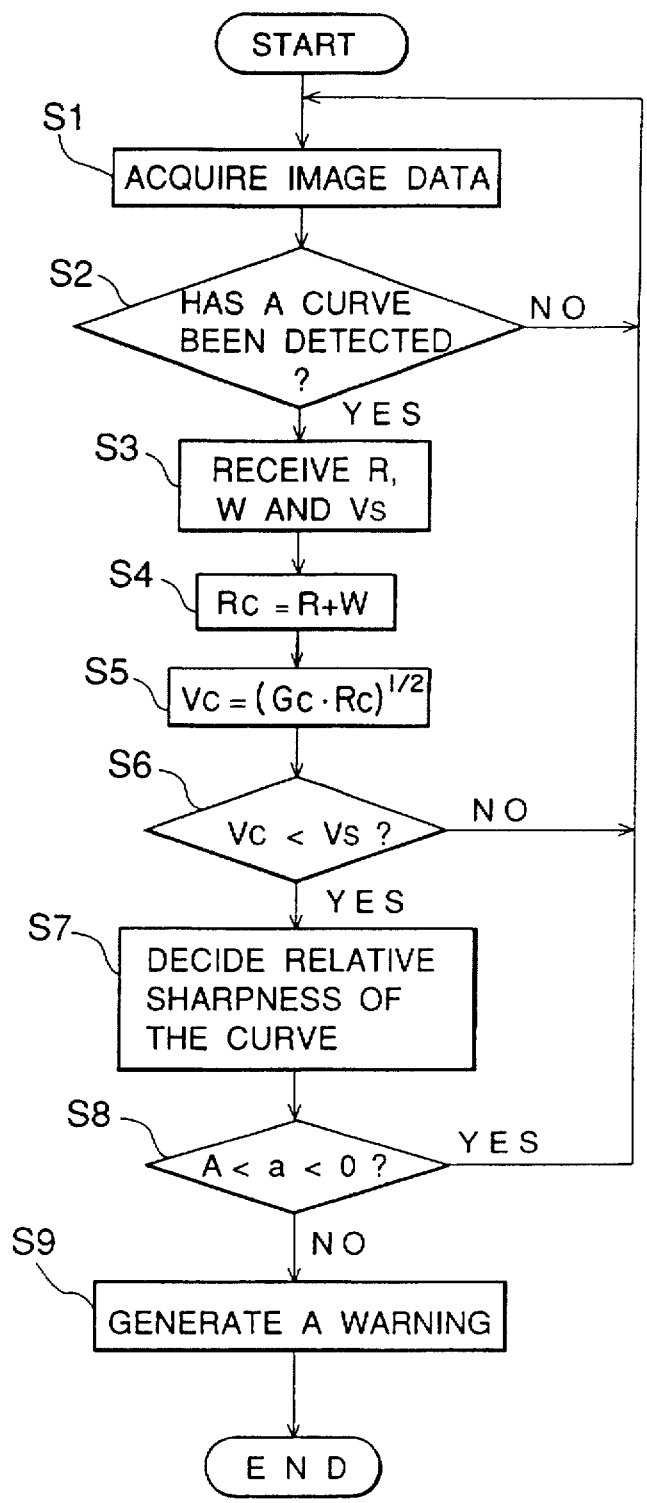
FIG. 7 is a warning control program to be executed by the warning system of FIG. 6.

Referring to FIGS. 6 and 7, an acceleration estimating device 46 calculates an acceleration necessary for changing the current traveling speed $V_c$ at a detection position at a set distance L (FIG. 5) from the curve C to a turning speed $V_c$ within the length L by using:

$$V_c^2 - V_s^2 = 2a \cdot L$$

$$a = (V_c^2 = V_s^2)/2L$$

When it is decided that the relative sharpness of the curve C is critical, an off-course travel estimating device 45 compares the necessary acceleration a and the current acceleration A detected by an acceleration sensor 33 in step S8. If A<a>0, off-course travel is possible and a warning is given in step s9. If the driver does not execute the danger avoiding operations in response to the warning or if the vehicles 1 is not decelerated properly by driver's danger avoiding operation and the actual deceleration is lower than the least necessary deceleration, a warning sound is generated. Thus, the possibility of off-course travel can be still more accurately estimated by the additional use of data representing the mode of actual deceleration caused by the driver's danger avoiding operation.

Although the invention has been described in its preferred embodiments, a signal indicating the traveling speed of the vehicle may be used instead of the deceleration signal indicating the deceleration caused by driver's danger avoiding operation. The warning device 34 that generates a warning sound employed in the preferred embodiments to give the driver a warning may be any warning device other than the warning device 34, such as a display disposed within a driver's field of view or a vibration generator set in the seat cushion or the seat back of the driver's seat, provided that the warning device is capable of effectively stimulating driver's senses.

As is apparent from the foregoing description, the warning system for a vehicle according to a first aspect of the present invention, comprises the image recognizing means for obtaining image data on road conditions and traffic conditions by three-dimensionally recognizing the road extending ahead of the vehicle and traffic conditions, the curve detecting means for detecting a curve on the basis of the image data before the vehicle enters the curve, the turning speed calculating means for calculating a reference curve traveling speed at which average drivers will drive the vehicle traveling the curve on the basis of the curvature and the width of the lane represented by the image data, the relative curve sharpness detecting means for deciding whether or not the relative sharpness of the curve is critical by comparing the reference curve traveling speed with the actual traveling speed of the vehicle, and the off-course travel estimating means for deciding, when the sharp curve detecting means decides that the relative sharpness of the curve is critical, whether or not the driver has carried out danger avoiding operations from the conditions of signals indicating decelerating operations and, if any danger avoiding operation has not been executed, deciding that off-course travel is possible and giving a warning. Thus, the warning system is capable of estimating the possibility of off-course travel before the vehicle enters the curve and of surely assisting the driver in safety operation when the vehicle travels through the curve.

Since the turning speed at which average drivers will drive the vehicle when the vehicle travels through the curve is estimated on the basis of the radius of curvature of the curve and the width of the lane and the turning speed is compared with the actual traveling speed of the vehicle before the vehicle enters the curve, a curve of a critical sharpness that will possibly cause off-course travel if the vehicle enters the curve at the current traveling speed can be surely decided. The possibility of off-course travel can be surely estimated through the decision of whether or not the drier has executed danger avoiding operations when the relative sharpness of the curve is decided to be critical. Since whether or not the drier has executed danger avoiding operations can be easily decided from the signals indicating decelerating operations, unnecessary warning is not provided and the reliability of the warning device is enhanced.

According to the second aspect of the present invention, the off-course travel estimating means calculates a deceleration necessary for decelerating the vehicle to a turning speed before the vehicle enters the curve when it is decided that the relative sharpness of the curve is critical, and estimates the possibility of off-course travel when the actual deceleration is lower than the calculated necessary deceleration. Accordingly, the possibility of off-course travel can be further accurately estimated by taking into consideration the mode of deceleration of the vehicle and preventive safety is enhanced.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A warning system for a vehicle having at least one wheel, an accelerator pedal, and a brake system with a brake pedal, said warning system comprising:

a pair of cameras mounted on the vehicle for taking a front picture thereof and for generating image signals;

a traveling speed sensor connected with the at least one wheel for detecting a vehicle speed and for producing a traveling speed signal;

an accelerator sensor mounted on the vehicle for detecting a depression degree of the accelerator pedal and for outputting an accelerator signal;

a brake switch connected with the brake system for detecting whether the brake pedal is depressed or not and for generating a brake signal;

an image recognizing means responsive to the picture signal for obtaining three-dimensional image data about road conditions and traffic conditions ahead of the vehicle and for producing a distance picture representing thereof;

a curve detecting means responsive to the distance picture for recognizing a curve in front of the vehicle and for generating a curve signal;

a radius calculating means responsive to the distance picture and curve signal for computing a curvature radius ahead of the vehicle and for outputting a curvature radius signal;

a turning speed calculating means responsive to the curvature radius signal for calculating a turning speed to pass through the curve and for generating a turning speed signal;

a curve sharpness deciding means responsive to the turning speed signal and the traveling speed signal for determining whether the curve is tight or not and for producing a curvature sharpness signal;

an off-course travel estimating means responsive to the accelerator signal, the brake signal and the curvature sharpness signal for judging whether the vehicle will pass through the curve at the turning speed and for outputting a decision signal; and an alarming device responsive to the decision signal for generating an alarm signal when judged that it is dangerous for the vehicle to pass through the curve at the vehicle speed so as to avoid a dangerous condition before entering the curve.

2. The warning system according to claim 1, wherein:

said off-course determining means calculates a deceleration rate required to properly negotiate the curve and determines that the vehicle will not pass safely pass through the curve when an actual deceleration is lower than the deceleration rate.

* * * * *